United States Patent
Mishra et al.

(10) Patent No.: US 10,042,797 B2
(45) Date of Patent: Aug. 7, 2018

(54) VOLTAGE MODE AND CURRENT MODE DEVICE ENUMERATION

(71) Applicant: QUALCOMM Incorporated, San Diego, CA (US)

(72) Inventors: Lalan Jee Mishra, San Diego, CA (US); Richard Wietfeldt, San Diego, CA (US); George Wiley, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 236 days.

(21) Appl. No.: 15/014,385

(22) Filed: Feb. 3, 2016

(65) Prior Publication Data

US 2016/0224489 A1   Aug. 4, 2016

Related U.S. Application Data

(60) Provisional application No. 62/112,078, filed on Feb. 4, 2015, provisional application No. 62/147,266, filed on Apr. 14, 2015.

(51) Int. Cl.
| | |
|---|---|
| *G06F 13/00* | (2006.01) |
| *G06F 13/364* | (2006.01) |
| *G06F 13/42* | (2006.01) |
| *G06F 13/40* | (2006.01) |
| *G06F 13/38* | (2006.01) |

(52) U.S. Cl.
CPC ......... *G06F 13/364* (2013.01); *G06F 13/385* (2013.01); *G06F 13/404* (2013.01); *G06F 13/4282* (2013.01)

(58) Field of Classification Search
None
See application file for complete search history.

(56) References Cited

U.S. PATENT DOCUMENTS

| | | | | |
|---|---|---|---|---|
| 7,181,557 | B1* | 2/2007 | Falik | G06F 13/4286 710/105 |
| 7,606,955 | B1* | 10/2009 | Falik | G06F 13/4295 709/230 |
| 2006/0143348 | A1* | 6/2006 | Wilson | G06F 13/4291 710/110 |
| 2009/0091422 | A1* | 4/2009 | Minoo | G06F 13/4282 340/5.8 |
| 2009/0326730 | A1* | 12/2009 | Bjeljac | H03K 7/08 700/296 |
| 2014/0108479 | A1* | 4/2014 | Rasmussen | G06F 17/156 708/322 |
| 2014/0108679 | A1 | 4/2014 | Mishra et al. | |

OTHER PUBLICATIONS

International Search Report and Written Opinion—PCT/US2016/016449—ISA/EPO—May 24, 2016.

* cited by examiner

*Primary Examiner* — Michael Sun
(74) *Attorney, Agent, or Firm* — Haynes and Boone, LLP

(57) ABSTRACT

An enumeration technique is provided that includes a master/slave embodiment and a half-duplex embodiment.

29 Claims, 12 Drawing Sheets

| Error Code | Error Code Meaning |
|---|---|
| 0x00 | Slave non-responsive ~400 |
| 0x01 | Slave enumeration field mismatch ~405 |
| 0x02 | Vendor-ID not found ~410 |
| 0x03 | Device-ID not found ~415 |
| 0x04 | Error mitigation type not supported ~420 |
| 0x05 | Flow control method not supported ~425 |
| 0x06 | Enumerated I/O length not supported ~430 |
| 0x07 | Enumerated message length not supported ~435 |
| 0x08 | Protocol type not supported ~440 |
| 0x09 | Physical link type not supported ~445 |

FIG. 4

VOLTAGE MODE AND CURRENT MODE DEVICE ENUMERATION

CROSS-REFERENCE TO RELATED APPLICATIONS

This application claims the benefit of U.S. Provisional Application No. 62/112,078, filed Feb. 4, 2015. In addition, this application claims the benefit of U.S. Provisional Application No. 62/147,266, filed Apr. 14, 2015.

TECHNICAL FIELD

This application relates to integrated circuits, and more particularly to the enumeration of slave integrated circuits.

BACKGROUND

Various digital signaling protocols have been developed to support communication between integrated circuits in a system such as a mobile device. Examples of such digital signaling protocols include general purpose I/O (GPIO) and universal asynchronous receiver transmitter (UART), serial peripheral interface (SPI), and inter-integrated circuit (I2C). As technology advances, these various digital signaling protocols have been enhanced. For example, the assignee of the present matter has developed a "virtual" GPIO architecture in which a GPIO state machine and interface serializes GPIO data from a processor and transmits the serialized GPIO data over a dedicated transmit pin. Since the processor needs no or minimal software modification in that it may continue to interface though a GPIO interface in a conventional fashion, the transmission of assorted GPIO signals over a dedicated transmit pin instead of over a corresponding plurality of conventional GPIO pins is transparent to the processor. A remote integrated circuit receives the serialized virtual GPIO data over a dedicated receive pin. Each virtual GPIO integrated circuit thus includes at least two pins (a transmit pin and a receive pin). In addition, a clock pin may be provided to synchronize the transmitting and receiving integrated circuits. In other embodiments, no clock pin is utilized such that there are both two-pin and three-pin virtual GPIO embodiments.

Since there are various digital signaling protocol configurations, it is desirable that the particular protocol being implemented be identified during device enumeration. However, existing device enumeration techniques assume that the signaling protocol for the master and slave are homogeneous.

Accordingly, there is a need in the art for improved enumeration techniques that support heterogeneous links and protocols.

SUMMARY

A master/slave enumeration technique is provided for a system of integrated circuits in which a master integrated circuit is guaranteed to power on before other slave integrated circuits in the same system. In addition, a half-duplex enumeration technique is provided for a system of peer integrated circuits in which no single integrated circuit is guaranteed to power on before its peers. The master/slave enumeration technique will be discussed first followed by a discussion of the half-duplex enumeration technique.

In a master/slave enumeration embodiment, the master device is configured to power on before the remaining devices. The remaining devices that interface with the master device are denoted herein as slave devices (note that the terms "device" and "integrated circuit" are deemed herein to be equivalent). An example of a master device is a system on a chip (SOC) such as a smart phone processor that is engineered to always power on before its peripheral devices such as sensors or wireless interface modules. These remaining devices are slave devices in that they will be enumerated by the master device since the master device will be assured of powering on first. The slave devices may respond to the master device according to a voltage-mode signaling protocol using the same voltage signaling levels (e.g., transmission of ground signifies a binary zero versus transmission of a power supply voltage VDD to signify a binary one).

The master device and a slave device each include a dedicated transmit pin and a dedicated receive pin that are used in normal operation to communicate using a corresponding serial communication protocol. The master device's transmit pin couples to a receive pin of a corresponding slave device. The transmit pin of a slave device couples to the receive pin of the master device. These same pins are used in the enumeration mode of operation so that the master device may enumerate its slave devices. The master device may respond to an enumeration mode signal such as a power-on reset signal to initiate the enumeration mode of operation. Each slave device may be configured to assert its transmit pin to a power supply voltage after being powered on. The master device may thus monitor whether its receive pin is asserted to a power supply voltage to determine that the corresponding slave device is ready to be enumerated.

In the enumeration mode, the master device clocks its transmit pin with a predetermined number of clock cycles. This predetermined number is sufficient to retrieve the entirety of enumeration data stored by the clocked slave device. The master device's transmit pin couples to the slave device's receive pin such that the slave's receive pin is clocked as the master clocks its transmit pin. In response, the slave device shifts out its enumeration data through its transmit pin. The slave device's transmit pin couples to the master device's receive pin. For a system including a plurality of slave devices, the master device may thus include a transmit/receive pin pair for each slave device. The master device thus receives on its receive pin the slave's enumeration data. This enumeration data identifies the particular serial protocol used by the slave device to communicate through its dedicated transmit and receive pins during a normal mode of operation. The slave's transmit pin couples to the master's receive pin such that the master device receives the retrieved enumeration data on its receive pin. The enumeration data may comprise a wide variety of fields such as enumeration data for frame length, transmission protocol, flow control, and so on. With the slave devices all enumerated, the master and slave devices may then transition to a normal mode of operation. Assuming that there are no errors in the retrieved enumeration data and that the master device supports the particular serial communication protocol used by the slave device, the master device and the slave device may then begin the normal mode of operation subsequent to completion of the enumeration mode. For example, should the enumerated slave device be a 2-wire virtual GPIO (VGI) device, the dedicated transmit and receive pin for the master and slave devices would be used in the normal mode of operation as a 2-wire VGI interface. The half-duplex enumeration technique will now be discussed.

The half-duplex enumeration technique may be used in a system of all peer devices in which a system designer cannot be sure which peer device will power up first. Should each device then act as a master device and attempt to clock its peers as discussed above with regard to the master/slave enumeration technique, a race condition could result in which a device's transmit pin and receive pin are both clocked. Retrieval of enumeration data during such simultaneous clocking is hindered in that both the transmit pins and receive pins are not available for data transmission due to their clocking. To prevent such a race condition in a peer system environment, each device is configured to assert its transmit pin to a power supply voltage upon power-up. This assertion of the transmit pin voltage by a first powered-on device is received at the receive pin of a second peer device having its receive pin coupled to the transmit pin of the first peer. The second peer device is thus notified that the first peer device is ready to be enumerated. To begin enumeration, one peer device pulses a current or voltage pulse through its transmit pin. This pulse is received by a receiving device at its receive pin. The receiving device then responds to the received pulse by transmitting one or more current or voltage pulses through its receive pin to begin the transmission of enumeration data to the remaining peer. The transmission is thus half-duplex in that the two devices are sharing a single link or wire. However, note that the devices include a two-wire interface analogous to that discussed above with regard to the master/slave enumeration technique. Subsequent to enumeration, the peer devices may thus use their two-wire interfaces in a normal mode of operation as they would in the two-wire enumeration technique. But whereas the master/slave mode of enumeration uses both pins, note that the half-duplex enumeration technique occurs over a single pin/wire for each device.

Although the half-duplex enumeration technique occurs over a single wire, note that both peer devices may enumerate each other simultaneously. For example, each peer device may enumerate another peer device through its transmit pin as discussed above. No race condition can occur since each enumeration occurs on its own corresponding wire. In contrast, the master/slave (two-wire) enumeration technique discussed above requires a master device that is assured to power-up first so that a race condition does not result during enumeration. The advantageous features for both modes of enumeration may be better appreciated through the following detailed description.

BRIEF DESCRIPTION OF THE DRAWINGS

FIG. 4 illustrates some example error codes for the enumeration system of FIG. 1A.

Embodiments of the disclosure and their advantages are best understood by referring to the detailed description that follows. It should be appreciated that like reference numerals are used to identify like elements illustrated in one or more of the figures.

DETAILED DESCRIPTION

Two modes of enumeration are disclosed herein. A master/slave (two-wire) mode of enumeration may advantageously be implemented in a master/slave architecture in which the master device is guaranteed to control the enumeration. Alternatively, a half-duplex mode of enumeration may be implemented in a system of peer devices in which there is no guaranteed master device that will power-up before its slaves. The two-wire mode of enumeration will be discussed first.

Two-Wire Enumeration

The following example embodiments are directed to the enumeration between a two-wire and three-wire virtual GPIO link and protocol but it will be appreciated that the systems and methods disclosed herein are widely applicable to any suitable serial digital signaling protocol and corresponding link architecture. For example, integrated circuits configured to communicate through a universal asynchronous receiver transmitter (UART) interface, serial peripheral interface (SPI), or an inter-integrated circuit (I2C or I3C) interface may all be configured to practice the enumeration techniques discussed herein.

Figure 1A:
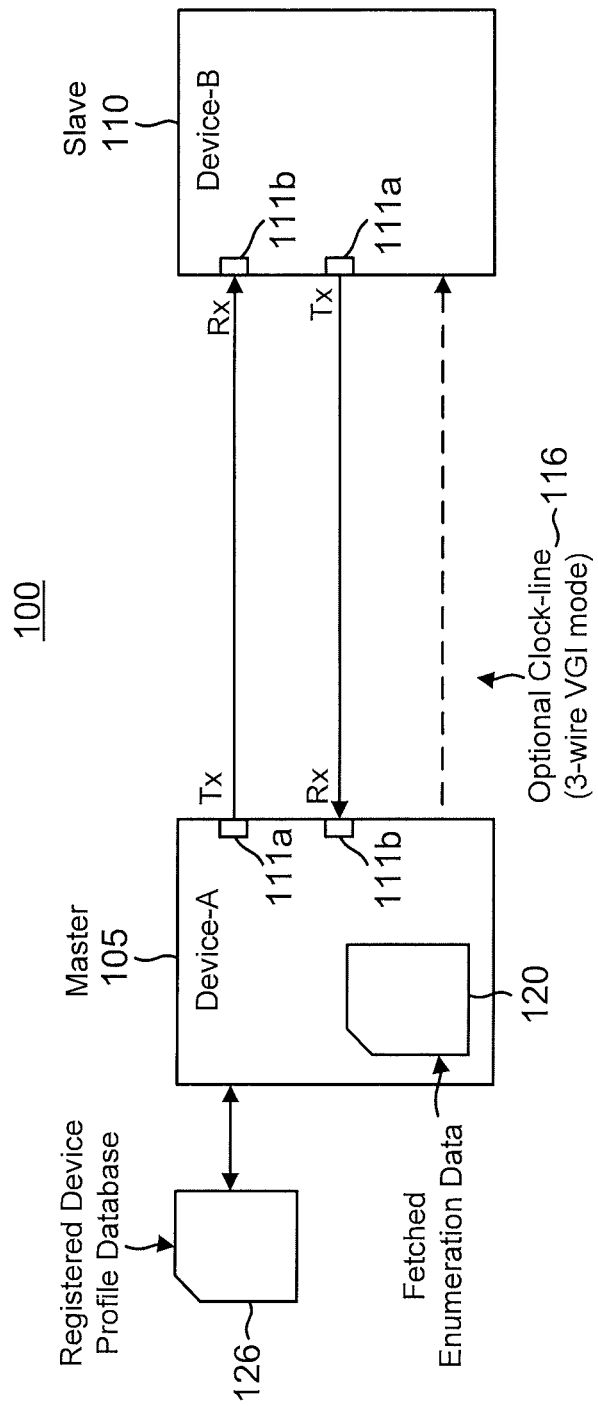
FIG. 1A is a block diagram of a master/slave enumeration system in accordance with an embodiment of the disclosure.

Turning now to the drawings, FIG. 1A illustrates an example master/slave enumeration system 100. A master integrated circuit (master device A) 105 and a slave integrated circuit (slave device B) 110 each includes a dedicated transmit pin (TX) 111a and a dedicated receive pin (RX) 111b. Master device 105 is deemed the master since it is configured to control the enumeration process. Slave device 110 is thus configured to respond to the enumeration process that is controlled by master device 105. To provide a better appreciation of the advantageous enumeration features for system 100, normal virtual GPIO operation for system 100 will first be discussed. Each device's TX pin 111a couples to the other device's RX pin 11b. As discussed above, during a virtual GPIO communication session, a GPIO interface (discussed further below) in each device receives GPIO data from the device's processor (not illustrated). Some of this GPIO data may then be transferred to the remote device over GPIO pins in a conventional GPIO fashion. But a remaining portion of the GPIO data is serialized by a virtual GPIO state machine (discussed further below) for transmission as serial virtual GPIO data over dedicated TX pin 111a. It is transparent to the processor (not illustrated) in each device whether the GPIO data is transmitted over the GPIO pins or over dedicated TX pin 111a—thus the serialized GPIO data is denoted as "virtual" GPIO in that to the processor, it is GPIO data. But this virtual GPIO data is not transmitted over GPIO pins from each device 105 and 110 but instead is serialized and transmitted over the device's dedicated TX pin 111a.

Figure 1B:
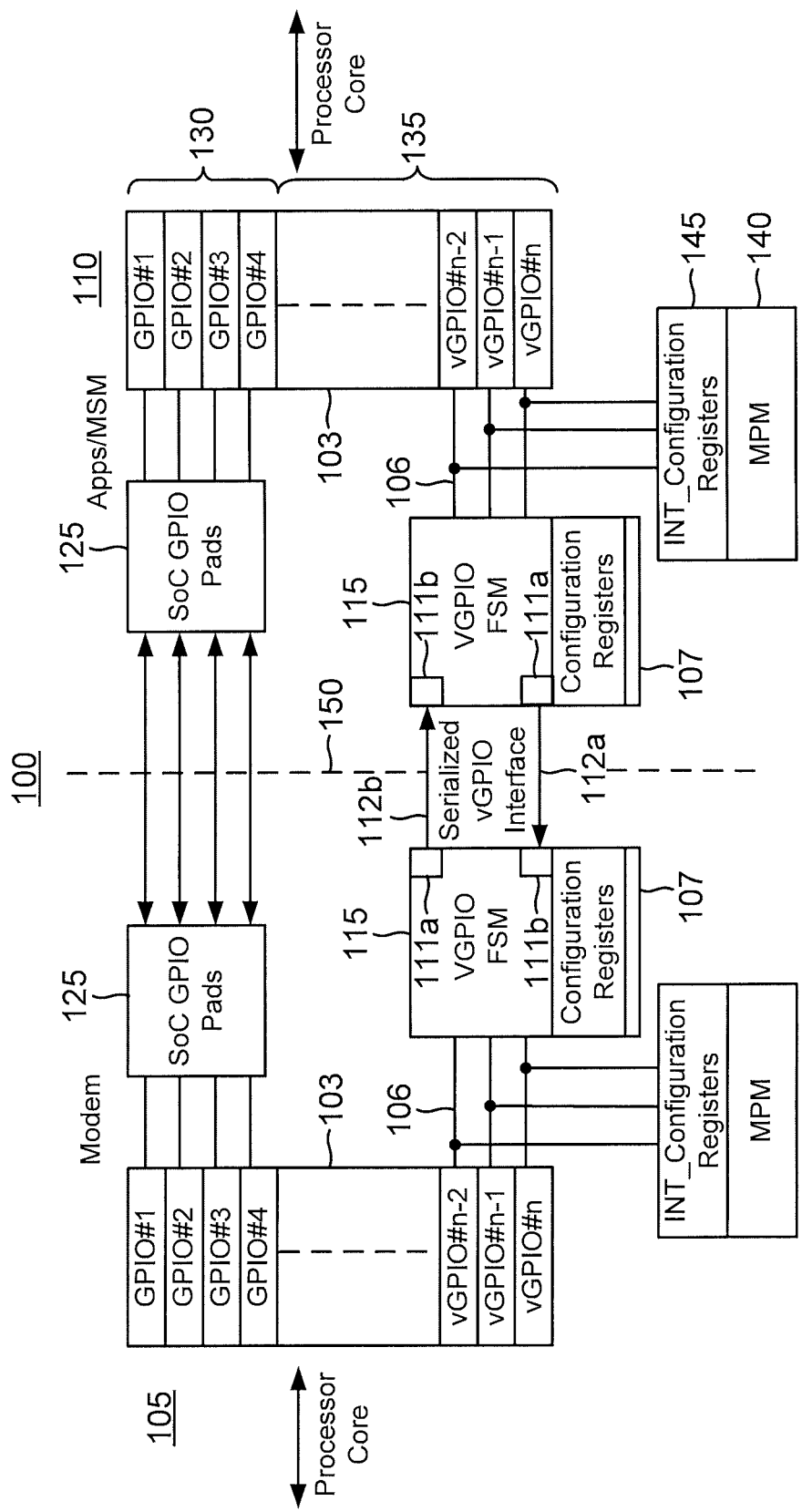
FIG. 1B is a block diagram for a virtual GPIO enumeration system in accordance with an embodiment of the disclosure.

The VGI state machine in the receiving device de-serializes the virtual GPIO data and presents the de-serialized virtual GPIO data to its GPIO interface. From the GPIO interface, the de-serialized virtual GPIO data is presented as GPIO data to the receiving device's processor. To synchronize the transmission and reception of the virtual GPIO data (which is encapsulated in virtual GPIO frames), each device 105 and 110 may include a clock pin for receiving an external clock 116. Alternatively, each device 105 and 110 may be configured for a "2-wire" VGI protocol in which an external clock does not synchronize the communication. An example 2-wire embodiment of system 100 is shown in FIG. 1B. A transmit line or lead 112a for transmitting virtual GPIO signals from master device 105 over a transmit pin 111a is also the receive line for receiving these signals at slave device 105 on a receive pin 111b. Similarly, a transmit line 112b for slave device 110 for transmitting its virtual GPIO signals is also the receive line for master device 105. These transmit and receive lines may be carried on a circuit board between the integrated circuits as indicated by dashed line 150. A finite state machine (FSM) 115 in each device 105 and 110 controls the transmission and reception of the virtual GPIO signals using these dedicated lines and pins.

As known in the GPIO arts, the processor for each device includes a GPIO interface 103 through which it interfaces with a plurality of GPIO pins 125. Advantageously, each processor may operate in a conventional fashion with its corresponding GPIO interface 103. In other words, each processor receives and transmits signals through its GPIO interface 103 in a conventional manner such the processors need no software modification to communicate through GPIO interfaces 103. A certain portion of the signals processed through each GPIO interface 103 may be transmitted and received on conventional GPIO pins 125 as GPIO signals 130. But a remaining portion of the signals processed through GPIO interface 103 are not transmitted or received through conventional GPIO pins 125. Instead, this remaining portion of the signals processed through GPIO interface 103 comprises a plurality of virtual GPIO signals 135 that are serially transmitted from FSM 115 over the dedicated transmit pin (or pad) 111a and received on the dedicated receive pin (or pad) 111b. The portion of the signals received at a GPIO interface 103 from the corresponding device's processor that are processed as conventional GPIO signals 130 may be denoted herein as a first set of signals. Similarly, the remaining portion of the signals received at a GPIO interface 103 from the corresponding device's processor that are processed as virtual GPIO signals 135 may be denoted herein as a second set of signals. In contrast to conventional GPIO signals 130, each virtual GPIO signal 135 does have its own dedicated pin but instead is serially multiplexed with the remaining virtual GPIO signals 135 on pins 111a and 111b. This is quite advantageous in that each processor core requires no retooling of its GPIO interface 103 yet the resulting virtual GPIO communication achieves a significant reduction of pins as compared to a conventional GPIO embodiment in which each virtual GPIO signal 135 would require its own dedicated GPIO pin. Because virtual GPIO signals 135 are accommodated using a finite state machine such as FSM 115, the processor cores may be asleep or in other types of dormant states yet be able to receive virtual GPIO signals 135. In this fashion, a virtual GPIO architecture not only advantageously economizes the number of pins for each GPIO interface 103 but is also low power.

As used herein, "pin" is a generic term to cover the structure such as a pad or an actual pin that an integrated circuit uses to couple to leads on circuit board or other physical interconnect (e.g., package interconnect or through-hole via interconnect). For example, if each device 105 and 110 has sixteen GPIO pins 125, then these pins could be configured to accommodate eight symmetric GPIO signals 130 (for illustration clarity, only four conventional GPIO signals #1 through #4 are shown in FIG. 1) or sixteen asymmetric GPIO signals 130. Symmetric GPIO signals 130 are thus signals that are transmitted by both devices 105 and 110. If only one of devices 105 and 110 transmits a certain type of GPIO signals 130, the resulting GPIO signal 130 is denoted as asymmetric. In addition, each device 105 and 110 can accommodate the input/output interfacing of a plurality of n virtual GPIO signals 135 using its transmit pin 111a and receive pin 111b, wherein n is an arbitrary plural integer. With regard to device's processor, there is no difference between GPIO signals 130 and virtual GPIO signals 135: they are both simply signals that are transmitted and received as necessary through GPIO interface 103. However, since virtual GPIO signals 135 do not have dedicated pins in contrast to conventional GPIO signals 130, virtual GPIO signals 135 are serialized in FSMs 115 for transmission on lines 112a and 112b. Upon reception, each FSM 115 deserializer the received serialized virtual GPIO signals. Thus, each FSM 115 functions as a serializer/deserializer with regard to virtual GPIO signals 135.

To identify the presence of received virtual GPIO signals 135 as transmitted from a remote processor, each device's processor may be configured to receive an interrupt signal in response to changes in selected ones of virtual GPIO signals 135. To provide the interrupt, a modem power manager (MPM) 140 may monitor the selected virtual GPIO signals as programmed through interrupt (INT_configuration) registers 145. If MPM 140 sees a monitored signal change state, it transmits an interrupt to its processor accordingly. In addition, each FSM 115 may include configuration registers 107 that store the current state of GPIO signals 135.

The serial transmission of virtual GPIO signals 135 between devices 105 and 110 may be performed responsive to samples of an oversampling clock analogous to the data transmission in a UART interface. Alternatively, each bit for virtual GPIO signals 135 may be transmitted as a corresponding pulse-width-modulated pulse over corresponding transmit pin 111a. For example, a pulse width of 25% of a bit period may be used to represent a binary zero whereas a pulse width of 75% of a bit period may be used to represent a binary one. More generally, a transmitted pulse may have either a first pulse width or a second pulse width depending upon the binary value for a corresponding virtual GPIO signal 135 bit. This pulse transmission is quite advantageous in that it enables asynchronous transmission (no common clock) between devices 100 and 105. For example, FSM 115 may pulse width modulate each transmitted pulse responsive to cycles of a suitable clock such as a ring oscillator. Additional details for the pulse width modulation are discussed in commonly-assigned U.S. application Ser. No. 14/540,366, filed Nov. 13, 2014, the contents of which are incorporated by reference herein. Note that a transmit line 112a may be multiplexed by devices 105 and 110 such that a transmit pin 111a is sequentially used as a receive pin 111b. The resulting VGI interface (not illustrated) would thus operate as "1-wire" VGI interface in that only one line is necessary for both the receive and transmit sets of VGI signals 135.

Regardless of whether system 100 is configured as a 1-wire, 2-wire, or 3-wire VGI system for serial communication of VGI signals 135, note the difference between a conventional GPIO signal 130 and a VGI signal 135. In particular, a conventional GPIO signal 130 is identified through its receipt on a corresponding one of conventional GPIO pins 125. In contrast, FSM 115 identifies a VGI signal 135 in a VGI frame though its position in the frame. For example, if the payload size for a VGI frame is eight bits arranged from a first bit through a last bit, there would be eight different bit positions in the VGI frame payload. Both the transmitting and receiving FSM 115 may thus be configured with the information of which bit position corresponds to which VGI signal. Different FSMs 115 may be configured at power-up to use different size VGI frames. The VGI frame size is thus a parameter that may be enumerated at power-up so that master device 105 and slave device 110 may communicate using the appropriately-sized VGI frames.

There are other parameters that may be enumerated at power-up of system 100. Prior to enumeration, master device 105 may not know whether the slave device 110 is a 1-wire, a 2-wire or a 3-wire virtual GPIO device. The disclosed enumeration solves this problem such as by being triggered by a power-on reset signal or other suitable signal. Upon triggering of the enumeration mode, master device 105 clocks or pulses its TX pin 111a. The received pulses on its RX pin 111b trigger slave device 110 to shift out its enumeration data responsive to the received pulses. For example, a bit of enumeration data may be shifted out on the slave device's TX pin responsive to each pulse it receives on its RX pin. Each FSM 115 may be configured to perform this enumeration. Each FSM 115 is thus configured to function as an enumeration state machine. Alternatively, the enumeration may be implemented through software on each device's processor. In a software-controlled enumeration embodiment, master device 105 strobes its transmit pin 111a using a bit-banged clock signal (not illustrated). Regardless of the nature of the clock used by master device 105, the resulting fetching of the enumeration data by slave device 110 may be responsive to a single edge of the clock or responsive to both edges.

Figure 2:
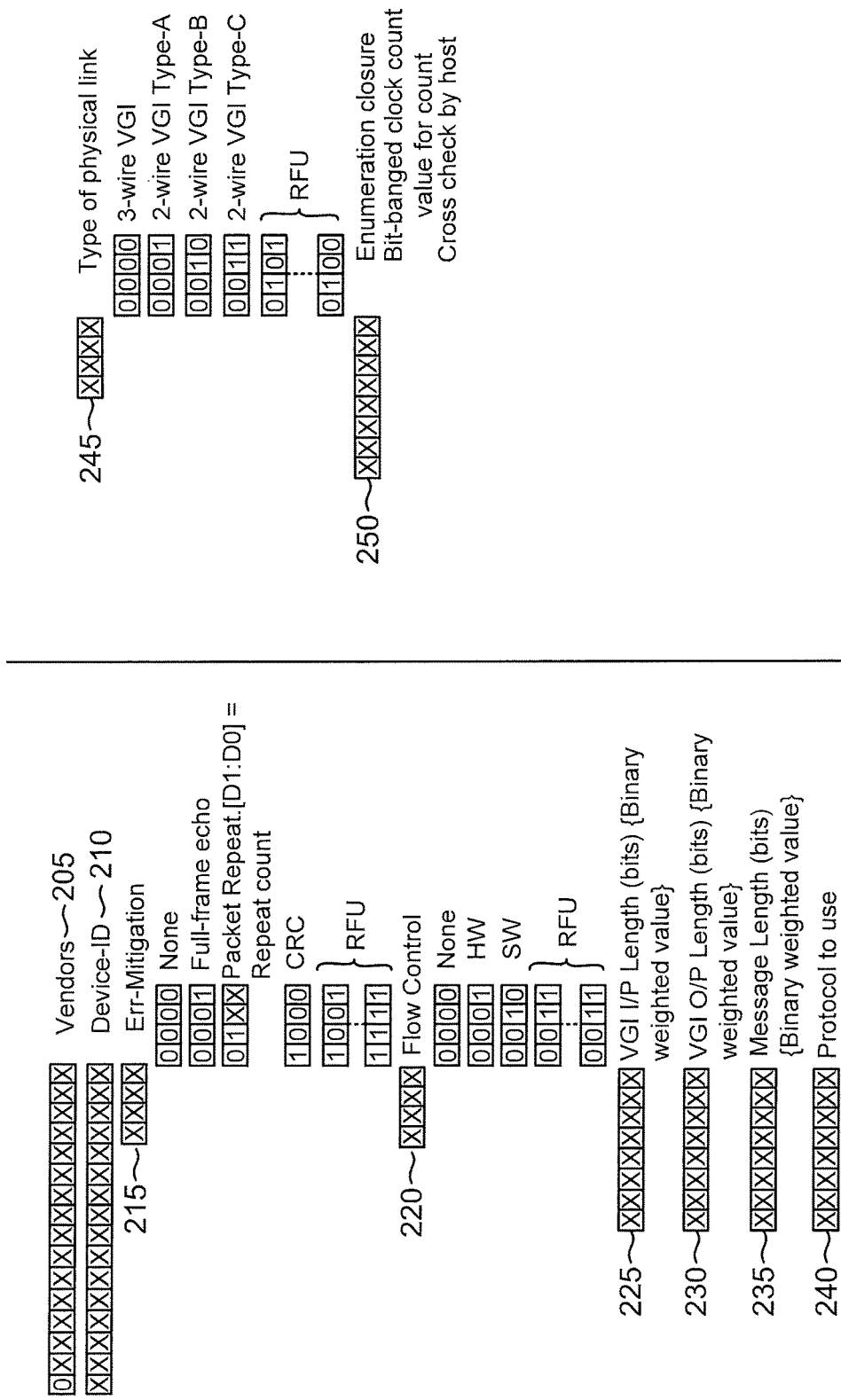
FIG. 2 illustrates an example enumeration data format for the slave device of FIG. 1A.

The format for the enumeration data stored in slave device 110 may be as shown in FIG. 2. A field 205 is reserved for an identification number for the device vendor. A field 210 is reserved for an identification number for slave device 110. A field 215 identifies the error mitigation for slave device 110. Example values for field 215 may identify whether CRC, packet-repeat, full-frame echo, or no error mitigation is used. In addition, certain values for field 215 may be reserved for future use (RFU). Another field 220 identifies the type of flow control—for example, there may be hardware (HW) flow control, software flow control (SW) or none.

The virtual GPIO (VGI) input and output frame lengths may be identified through fields 225 and 230 as binary-weighted values, respectively. A field 235 identifies the message length for the VGI frames as a binary-weighted value. A field 240 may identify the communication protocol (e.g., VGI, UART, SPI, I2C, and so on). Similarly, another field 245 identifies the type of physical link for the VGI protocol—for example, it may be 3-wire link or various versions of a 2-wire link. Finally, a field 250 represents the number of pulses counted by slave device 110 for count cross-checking by master device 105. It will be appreciated that the particular fields used for the enumeration data will vary depending upon the particular signaling protocol and associated physical link used by slave device 110.

Figure 3:
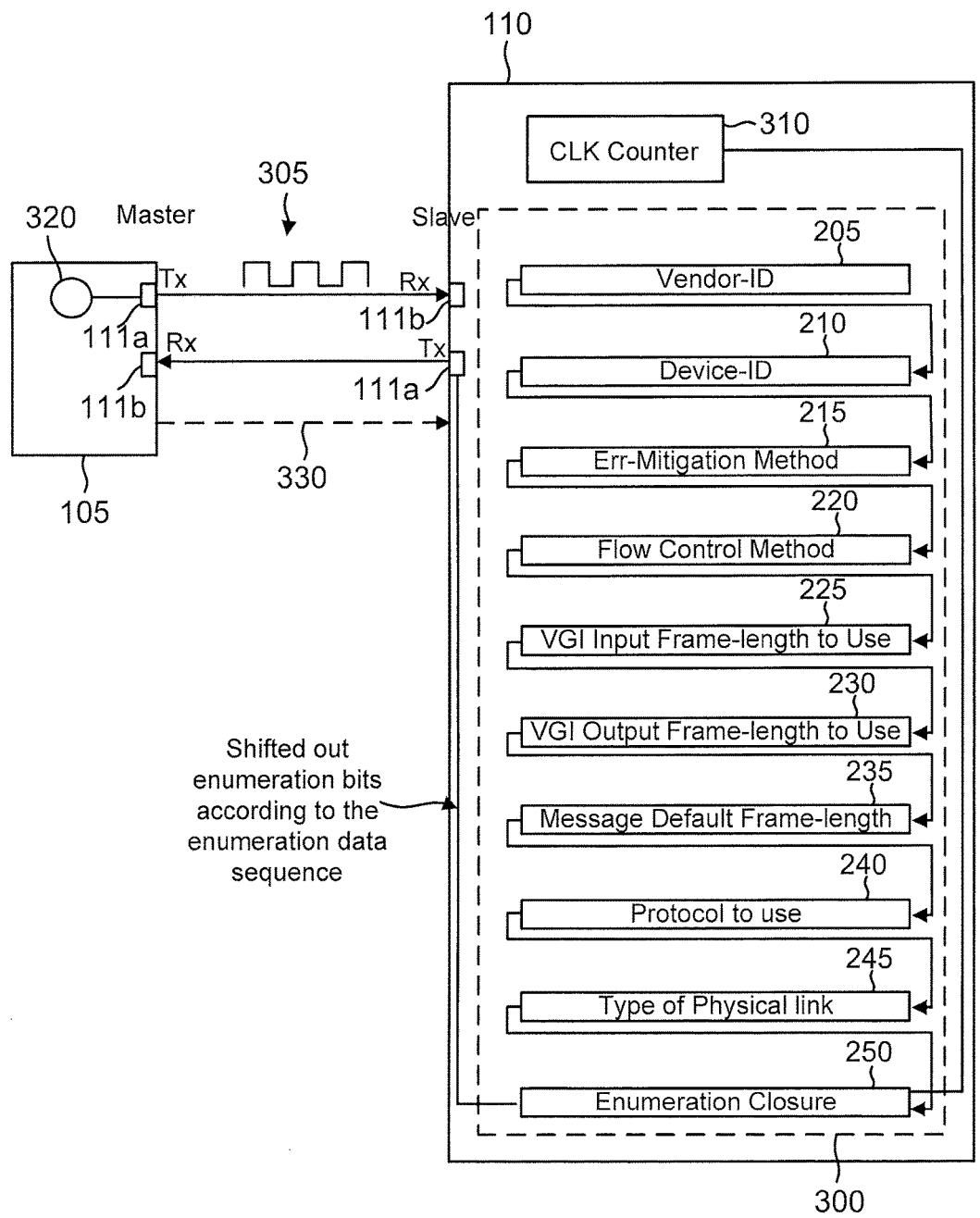
FIG. 3 illustrate the clocking of the slave device by the master device of FIG. 1A to retrieve the enumeration data.

Slave device 110 may store its enumeration data in a register linked-list array 300 as shown in FIG. 3 such that the enumeration data has a defined enumeration data sequence. In response to an assertion of a power-on reset (POR) signal, master device 105 clocks its transmit pin 111a with a clock signal 305 from a clock source 320. Slave device 110 receives clock signal 305 on its receive pin 111b. In response to single edges of clock signal 305 (or in response to both edges), slave device 110 shifts out the contents of register linked-list array 300. Slave device 110 may shift out one bit of the contents of register linked-list array 300 responsive to each triggering clock edge of clock signal 305. In that regard, the enumeration data may be considered to be arranged in an enumeration data sequence from the first bit of vendor field 205 through the last bit of clock count field 250. To instantiate clock count field 250, slave device 110 includes a clock counter 310. Counter 310 counts each triggering edge of clock signal 305 until the last bit of physical link field 245 is shifted out to create a clock count that is written into clock count (enumeration closure) field 250. The final series of clock cycles thus functions to shift out the clock count to master device 105.

Referring again to FIG. 1A, master device 105 may then write the fetched enumeration data from slave device 110 into an enumeration data memory 120. The stored enumeration data may then be combined with profile data from a registered device profile database 126 so that master device 105 may resume normal operation according to the enumerated serial protocol with slave device 110. For example, the enumeration data may confirm to master device 105 that slave device 110 is a 3-wire VGI device. Master device 105 may then begin communicating with slave device 110 using a 3-wire VGI protocol. Alternatively, if the enumeration data identifies slave device 110 as a 2-wire VGI device, master device 105 would communicate with slave device 110 using a 2-wire VGI protocol. The profile data from database 126 may identify, for example, the types of GPIO data that will be exchanged through the VGI interface. Dedicated TX pin 111a and RX pin 111b for each device 105 and 110 thus have two modes of operation. In an enumeration mode, these pins are used for the retrieval of enumeration data as discussed above. In a normal mode of operation, these pins function as part of whatever communication link that the enumeration data has enumerated.

Having retrieved the enumeration data, master device 105 may proceed to identify any errors. For example, if the returned count is incorrect, master device 105 may register an error code 400 identifying that the slave device 110 is non-responsive as shown in FIG. 4. Numerous such error codes may be generated such as an enumeration field mismatch 405, a missing vendor ID error 410, a missing device ID error 415, an error mitigation type not being supported error 420, a flow control method not being supported error 425, an enumerated I/O length not being supported error 430, an enumerated message length not being supported error 435, a protocol type not being supported error 440, and a physical link type not being supported error 445.

Prior to enumeration, master device 105 and slave device 110 may be in different power domains. In some embodiments, master device 105 thus includes a pin for receiving the power supply voltage for slave device 110. At the initiation of the enumeration mode, master device 105 may thus determine whether slave device 110 is in a different power domain. Similarly, slave device 110 may include a pin for receiving the power supply voltage for master device 105 such that slave device 110 will also know at the initiation of the enumeration mode whether master device 105 is in a different power domain. The communication of the power domain for each device 105 and 110 is represented in FIG. 3 by dashed line 330. If the power domains differ, the clocking to retrieve the enumeration data may be performed using current-mode clock pulses. Alternatively, if the power domains are the same, the clocking may be performed using voltage-mode clock pulses. The resulting enumeration of slave device 110 may then determine whether the normal mode of operation uses a voltage-mode signaling or a current-mode signaling over the communication link including the dedicated receive and transmit pins.

Figure 5:
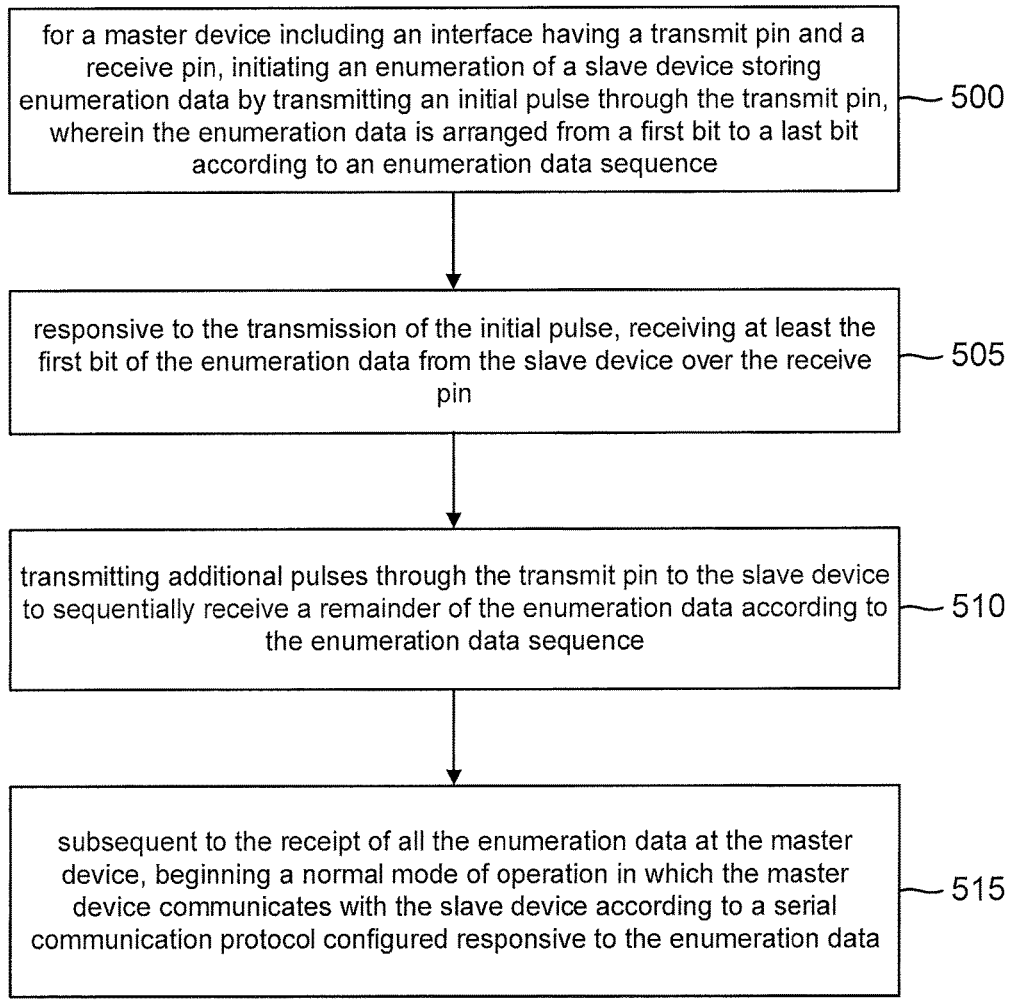
FIG. 5 is a flowchart for an example method of enumeration for the master device of FIG. 1A.

An example enumeration method for master/slave system 100 will now be discussed with regard to the flowchart of FIG. 5. The method includes an act 500 of, for a master device including an interface having a transmit pin and a receive pin, initiating an enumeration of a slave device storing enumeration data by transmitting an initial pulse through the transmit pin, wherein the enumeration data is arranged from a first bit to a last bit according to an enumeration data sequence. The transmission of an initial cycle of clock signal 305 discussed with regard to FIG. 3 is an example of act 500. As shown in FIG. 3, the enumeration data is arranged according to an enumeration data sequence defined by the linking within register linked-list array 300. With regard to FIG. 3, the first bit in the enumeration data sequence is an initial bit of vendor-ID field 205. The last bit in the enumeration data sequence is an final bit of clock count (enumeration closure) field 250. It will be appreciated that such an enumeration data sequence is merely representative and may be varied in alternative embodiments.

The method further includes an act 505 of, responsive to the transmission of the initial pulse, receiving at least the first bit of the enumeration data from the slave device over the receive pin. In a single-edge embodiment, only the first bit would be triggered by the first pulse. Conversely, the first and second bits would be triggered in a dual-edge embodiment.

In addition, the method includes an act 510 of transmitting additional pulses through the transmit pin to the slave device to sequentially receive a remainder of the enumeration data over the receive pin according to the enumeration data sequence. As noted above, the pulses of clock signal 305 shown in FIG. 3 may be voltage-mode clock pulses or current-mode clock pulses.

Finally the method includes an act 515 of, subsequent to the receipt of all the enumeration data at the master device, beginning a normal mode of operation in which the master device communicates with the slave device according to a serial communication protocol configured responsive to the enumeration data. An example of act 515 would be normal operation for a two-wire VGI interface as enumerated through acts 500 to 510. Although the preceding discussion was directed to a device-to-device enumeration, it will be appreciated that the concepts and techniques disclosed herein are readily extended to multi-point-to-point enumerations. The half-duplex enumeration technique will now be discussed.

Half-Duplex Enumeration

Although the two-wire enumeration technique just discussed is widely applicable to systems such as, for example, smartphones in which there is an SOC that is guaranteed to power-up first and thus will be assured of having a master device role, it is possible that a slave device may also power up at the same time as the master device. The slave device may then take the role of another master device and begin clocking the master device to receive its enumeration data. However, the master device may also be clocking the slave device at that time such that both devices will receive a clock instead of enumeration data. The enumeration will thus fail such that both devices may re-attempt enumeration. Since the devices are asynchronous, it is unlikely that both devices will again collide and clock each other simultaneously. However, it may be the case that another collision occurs, followed by another collision, and so on. Note that a smartphone must guarantee service such as for emergency calls. Although the likelihood of such repeated collisions is quite unlikely, the following half-duplex mode of enumeration guarantees that no such collisions will occur. More generally, the half-duplex enumeration technique may be implemented in systems in which there is no guarantee of a master device in the sense of having a device that is assured of being the first to power-on and thus assume the role of the master device. Since there is no guarantee of a master device, the corresponding system is deemed herein to comprise a system of peer devices. Like the master and slave devices discussed earlier, each peer device includes a two-wire interface. A third wire may also be included for receiving an external clock such as in the case of a 3-wire VGI interface.

Should each peer device act as a master device and attempt to clock its peers as discussed above with regard to the two-wire enumeration technique, a race condition could result in which a peer device transmits a clock over its transmit pin but then receives another clock on its receive pin should the remote peer device also be assuming the role of a master device. There could be no retrieval of enumeration data during such simultaneous clocking in that both the transmit pins and receive pins are not available for data transmission due to their clocking. Such simultaneous clocking cannot occur in the following half-duplex enumeration technique. In a half-duplex enumeration system, each device is configured to assert its transmit pin to a power supply voltage upon power-up. This assertion of the transmit pin voltage by a first peer device signals to a second peer device that the first peer device is powered up. The assertion of the transmit pin voltage is thus akin to the Request to Send (RTS) assertion in a UART system. The assertion of the transmit pin voltage by a first powered-on peer device is received at the receive pin of a second peer device having its receive pin coupled to the transmit pin of the first peer. The second peer device is thus notified that the first peer device is ready to be enumerated. To begin enumeration, an initiating peer device pulses an initiating current-mode pulse or a voltage-mode pulse through its transmit pin. This pulse is received by an enumerated peer device at its receive pin. The enumerated device then responds to the received pulse by transmitting one or more current-mode or voltage-mode pulses through its receive pin to begin the transmission of enumeration data to the remaining peer. The enumeration data transmission is thus half-duplex in that the two devices are sharing a single link or wire. The transmission may be pulse-by-pulse such that the initiating device receives a single pulse back from the enumerated device in response to every transmitted pulse. Alternatively, the enumerated device may respond to a transmitted pulse by the initiating device by transmitting a frame of pulses over its receive pin to the transmit pin of the initiating device.

With regard to the peer devices, it may be the case that no guarantee can be made as to the voltage amplitude for their output pulses. For example, one peer device may respond during enumeration using a first power supply voltage whereas another responds according to a second power supply voltage that is different from the first power supply voltage. Given this divergence of voltage amplitudes for their enumeration pulse signaling, a receiving peer device having a relatively high power supply voltage could mistake a binary one pulse from a transmitting peer device using a relatively low power supply voltage as instead corresponding to a binary zero pulse (ground). To prevent such binary decoding errors, current-mode half-duplex enumeration embodiments are provided in which the signaling comprises current pulses. Alternatively, it may be the case that the peer devices are all guaranteed to signal using the same power supply voltage such that voltage mode pulses could be transmitted in alternative half-duplex enumeration embodiments. The following half-duplex embodiments are current-mode embodiments but it will thus be appreciated that corresponding voltage-mode signaling embodiments may be implemented in accordance with the disclosure.

Figure 6:
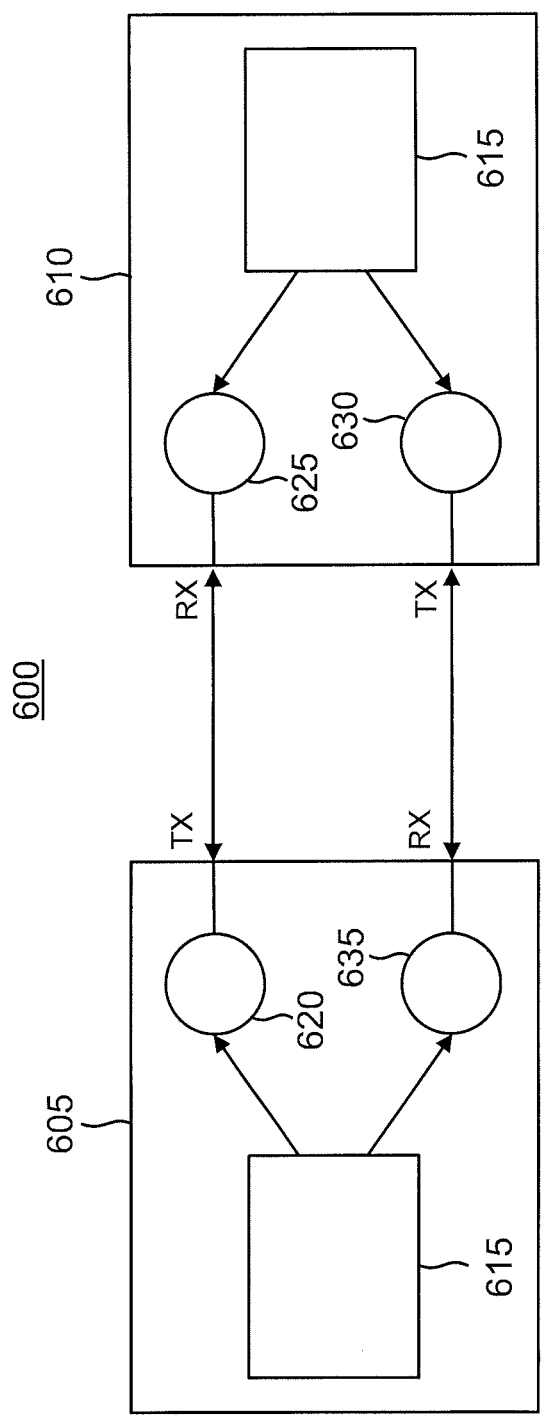
FIG. 6 is a block diagram of an example system configured for a half-duplex enumeration technique through a two-wire interface.

An example system 600 of current-mode peer devices 605 and 610 is shown in FIG. 6. Each peer device 605 and 610 includes a two-wire interface comprising a TX and RX pin such as discussed with regard to FIG. 1A. However, the designations of "TX" and "RX" only have meaning during the normal mode of operation subsequent to enumeration. During enumeration, each RX and TX pin is bi-directional. Each peer device 605 and 610 is configured to assert a voltage on its TX pin responsive to being powered on. For example, suppose that peer device 610 has just powered on after peer device 605. Peer device 605 detects through the resulting asserted voltage on its RX pin that peer device 610 is ready to be enumerated. To control the enumeration, each peer device 605 and 610 may include an enumeration state machine 615. Alternatively, the functions of enumeration state machine 615 may be implemented in firmware on the device's processor (not illustrated). In response to detecting that peer device 610 is powered on, enumeration state machine 615 in peer device 605 commands a current source 620 to pulse a first initiating current pulse through its TX pin to device 610. Enumeration state machine 615 in peer device 610 detects the current pulse and responds with one or more current pulses through its RX pin using its own current source 625 to transmit enumeration data to peer device 605. Similarly, peer device 610 may detect that peer device 605 has asserted its TX pin to the power supply voltage in response to being powered-on. Peer device 610 may then command a current source 630 to pulse a current pulse through its TX pin to peer device 605, which responds with one or more current pulses using a current source 635 to transmit enumeration data to peer device 610. Referring again to FIG. 1B, devices 105 and 110 may be configured as peer devices. In such an embodiment, each FSM 115 would be configured to also function as enumeration state machine 615.

Figure 7A:
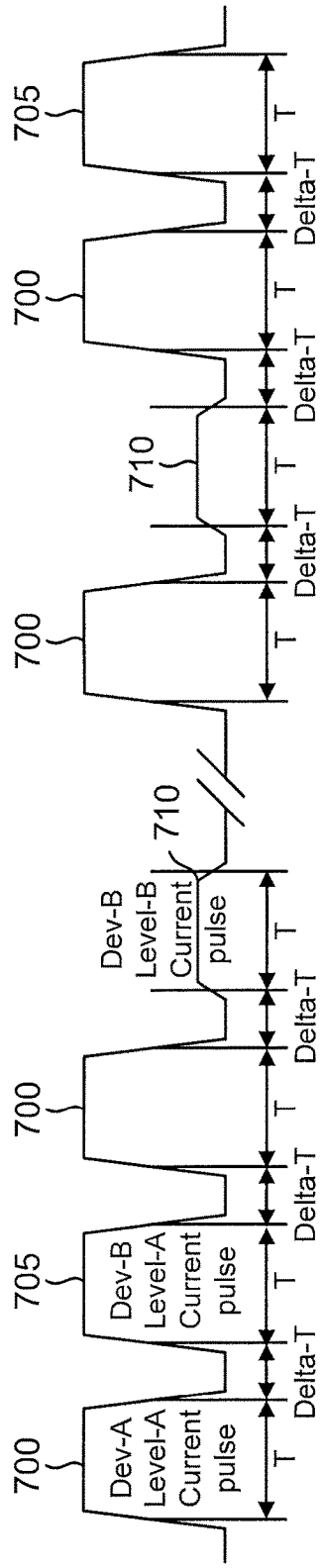
FIG. 7A is a timing diagram of amplitude-modulated current pulses being retrieved on a pulse-by-pulse basis in the system of FIG. 6.

In one embodiment, the enumeration data may thus be fetched in a pulse-by-pulse fashion such that an initiating device must transmit a separate pulse to obtain each return pulse from the enumerated device. An example of such pulse-by-pulse fetching is shown in FIG. 7A. An initiating peer device (designated as device A (Dev-A) transmits an initiating current pulse 700 over its TX pin to the RX pin of the enumerated peer device. In response, the enumerated peer device (Dev-B) transmits a bit of its enumeration data as a current pulse 705 over its RX pin to the TX pin of the initiating device. To provide a time-multiplexed separation between the pulses, each pulse may be separated from adjacent pulses by, for example, 25% of the pulse period. More generally, the separation between each pulse period T is represented by delta-T, where delta is some percentage of the pulse period T. The initiating device receives current pulse 705 and decodes it based upon its amplitude. In a binary mode (two levels of amplitude), a first binary value may be represented by a first current amplitude such as 20 mA in current pulse 705 whereas a complementary second binary value may be represented by a second current amplitude such as 4 mA in a subsequent current pulse 710. Each current pulse may thus have a first level A of current of a second level B of current. Each peer device may include a local counter for determining pulse width and the delay between pulses. Examples of the resulting fields and the enumeration data sequence for the retrieved enumeration data may be as discussed with regard to FIGS. 2 and 3. Since the enumeration is carried out in a half-duplex fashion over a single wire, there can be no race condition. Indeed, each device may independently enumerate the corresponding device through its transmit pin as discussed above with regard to FIG. 6.

Figure 7B:
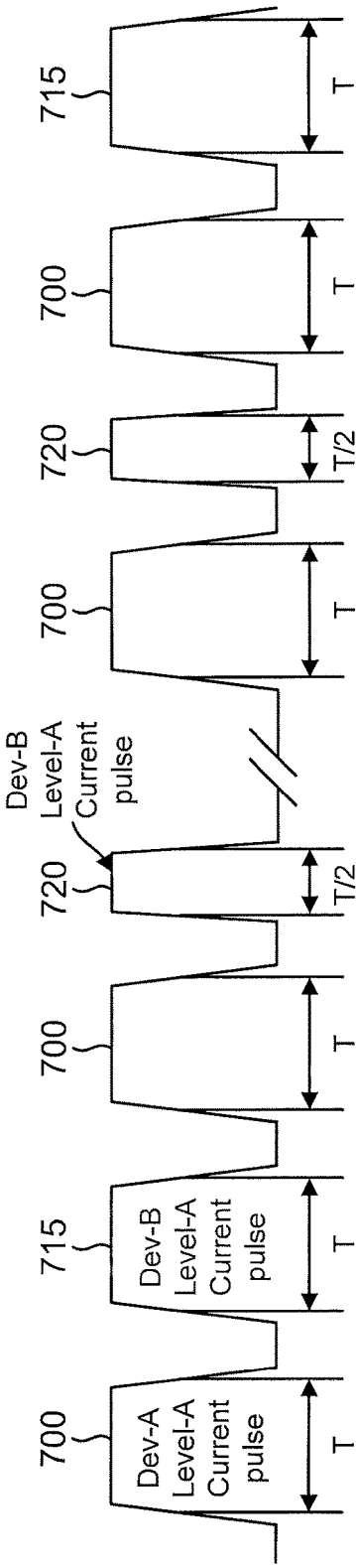
FIG. 7B is a timing diagram of pulse-width-modulated current pulses being retrieved on a pulse-by-pulse basis in the system of FIG. 6.

As an alternative to amplitude modulation, the retrieved pulses may be pulse-width modulated as shown in FIG. 7B. Initiating pulses 700 are transmitted as discussed with regard to FIG. 7A from a peer device A (Dev-A). Since no amplitude modulation is being used, each pulse such as a pulse 700 has the same level (level A) of current. However, the enumerated peer device (Dev-B) may respond on a pulse-by-pulse basis with either a first pulse 715 having a first pulse width or a second pulse 720 having a narrower pulse width. It will be appreciated that higher order modulations may be used having, for example, four different pulse widths.

Figure 7C:
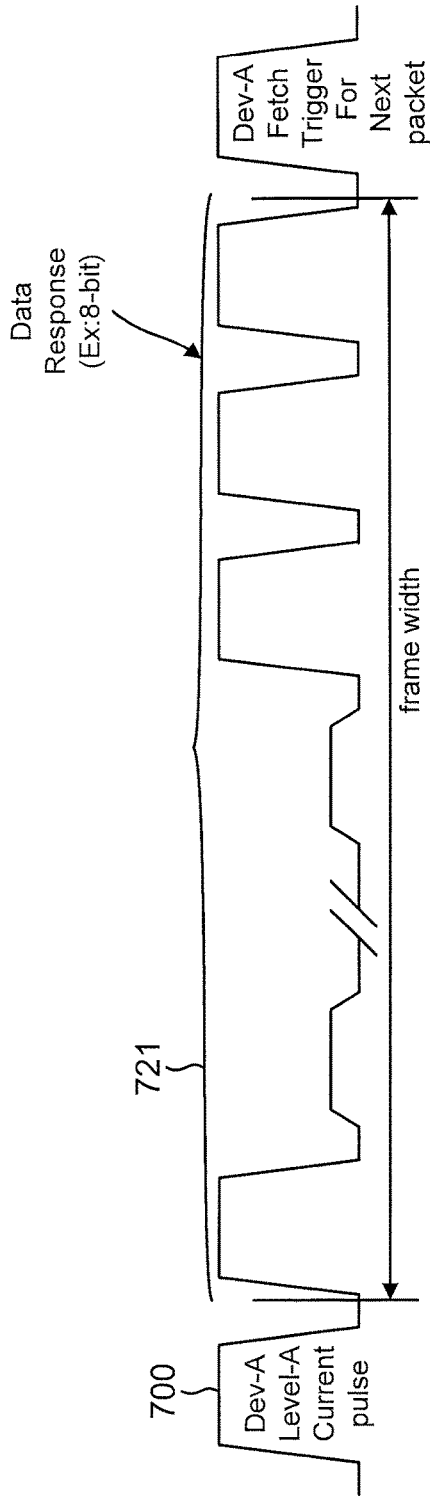
FIG. 7C is a timing diagram of amplitude-modulated current pulses being retrieved in a frame in the system of FIG. 6.
Figure 7D:
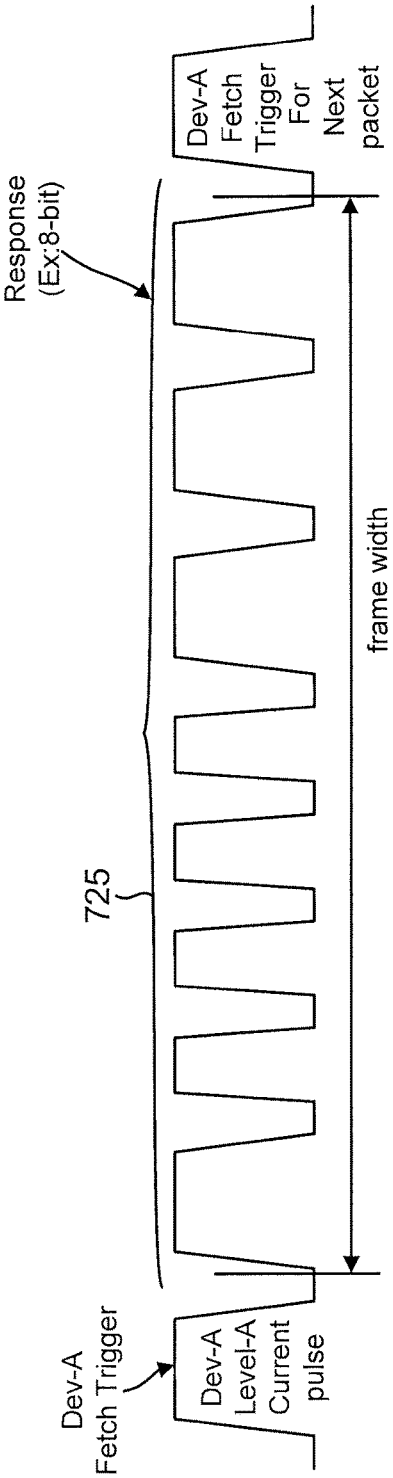
FIG. 7D is a timing diagram of pulse-width-modulated current pulses being retrieved in a frame in the system of FIG. 6
Figure 7E:
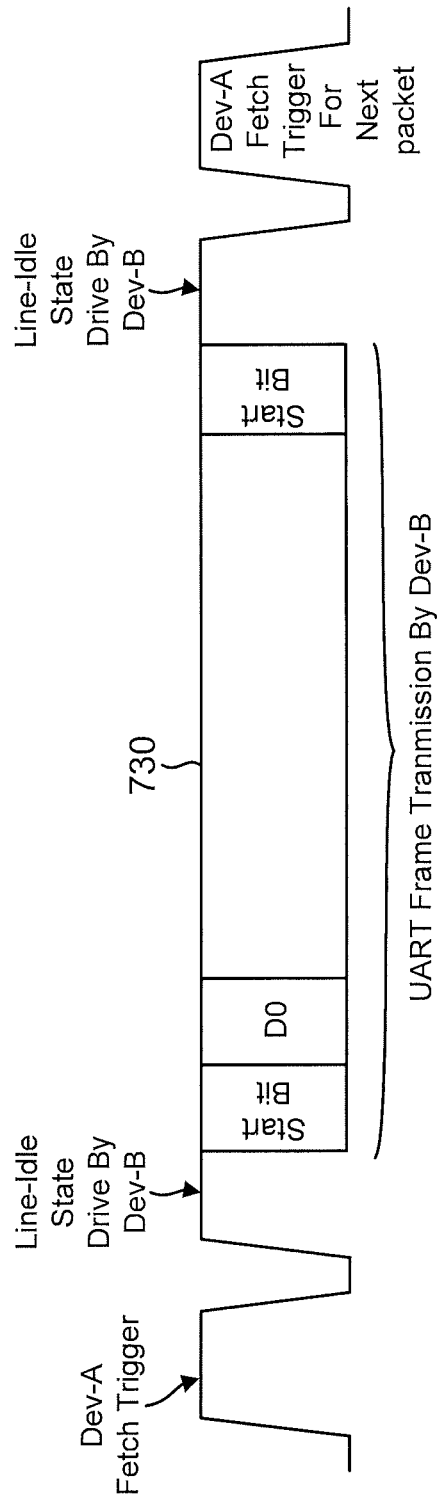
FIG. 7E is a timing diagram of UART-style current pulses being retrieved in a frame in the system of FIG. 6.

Rather than respond on a pulse-by-pulse basis, the enumerated peer device may respond to each initiating pulse 700 with a frame 721 of amplitude-modulated pulses as shown in FIG. 7C. Alternatively, the enumerated peer device may respond to each initiating pulse 700 with a frame 725 of pulse-width-modulated pulses as shown in FIG. 7D. In a UART embodiment, a frame 730 may be generated by the enumerated device following the UART protocol as shown in FIG. 7E in response to an initiating pulse (fetch trigger). According to the UART protocol, frame 730 includes a start bit and a stop bit. Each device may include an oversampling clock for sampling the frame. For example, if a 16X oversampling clock rate is used, each bit in frame 730 would be represented by 16 samples. To transmit a binary zero, the enumerated device simply does not pulse its RX pin for 16 samples of the oversampling clock. Conversely, the enumerated device would pulse its RX pin for 16 samples of the oversampling clock to transmit a binary one. It will be appreciated that other oversampling clock rates may be used in UART embodiments. Moreover, the current pulses of FIGS. 7A-7E may be replaced with voltage pulses in alternative embodiments. In FIGS. 7A-7E, master device 605 is denoted as "Device A" (abbreviated as Dev-A). Similarly, slave device 610 is referred to as "Device B" (abbreviated as Dev-B).

Figure 8:
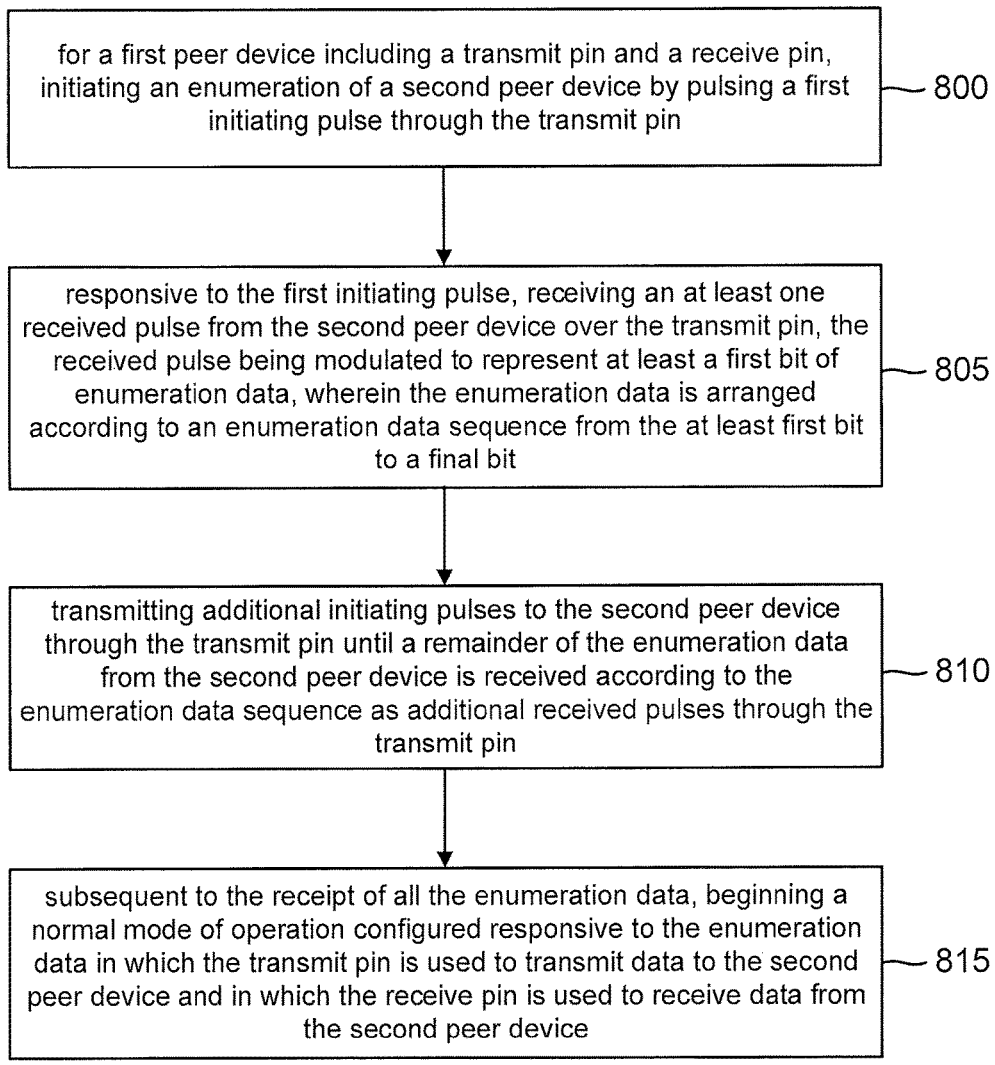
FIG. 8 is a flowchart for an example half-duplex enumeration method for the system of FIG. 6.

A method of operation for a half-duplex enumeration system will now be discussed with regard to the flowchart of FIG. 8. The method includes an act 800 of, for a first peer device including a transmit pin and a receive pin, initiating an enumeration of a second peer device by pulsing a first initiating pulse through the transmit pin. The transmission of the first initiating pulse 700 in FIGS. 7A through 7E is an example of act 800.

The method also includes an act 805 of, responsive to the first initiating pulse, receiving an at least one received pulse from the second peer device over the transmit pin, the received pulse being modulated to represent at least a first bit of enumeration data, wherein the enumeration data is arranged according to an enumeration data sequence from the at least first bit to a final bit. The transmission of the first pulse 705 in FIG. 7A or the first pulse 715 in FIG. 7B is an example of act 805.

Similarly, the method includes an act 810 of transmitting additional initiating pulses to the second peer device through the transmit pin until a remainder of the enumeration data from the second peer device is received according to the enumeration data sequence as additional received pulses through the transmit pin. The transmission of additional pulses 700 and receipt of corresponding pulses 705 and 710 discussed with regard to FIG. 7A is an example of act 810.

Finally, the method includes an act 815 of, subsequent to the receipt of all the enumeration data, beginning a normal mode of operation configured responsive to the enumeration data in which the transmit pin is used to transmit data to the second peer device and in which the receive pin is used to receive data from the second peer device. A VGI FSM such as FSM 115 of FIG. 1B that proceeds to normally operate according to the appropriate two-wire or three-wire VGI protocol is an example of act 815. An example electronic system configured for either a master/slave or half-duplex enumeration technique will now be discussed.

Figure 9:
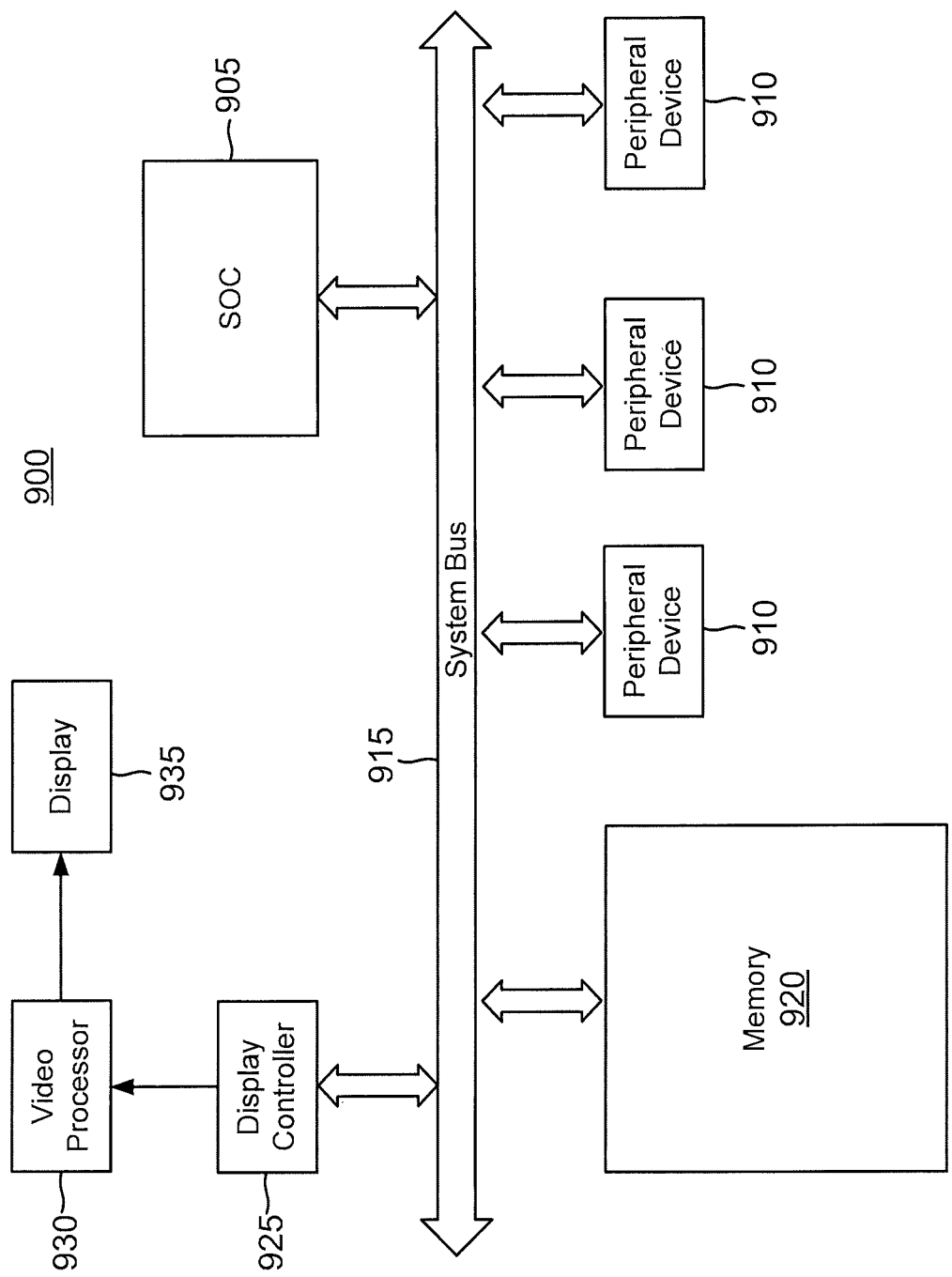
FIG. 9 is a block diagram of an example electronic system including a plurality of devices configured for a master/slave enumeration technique or a half-duplex enumeration technique.

An example system 900 is shown in FIG. 9 in which a system-on-a-chip (SOC) 905 is configured with an enumeration state machine (not illustrated) such as FSM 115 discussed above for communicating with a plurality of peripheral devices 910. Each peripheral device 910 thus also includes a corresponding enumeration state machine as well. The corresponding two-wire link between SOC 905 and each peripheral device 910 is also not shown for illustration clarity but contained within a system bus 915. Since there are three peripheral devices 910 in system 900, system bus 915 would include three two-wire links. System 900 may comprise a cellular phone, smart phone, personal digital assistant, tablet computer, laptop computer, digital camera, handheld gaming device, or other suitable device. In addition to communicating with peripheral devices 910, SOC 905 also communicates through system bus 915 with a memory such as a DRAM 920 and a display controller 925. Display controller 925 in turn couples to a video processor 930 that drives a display 935.

As those of some skill in this art will by now appreciate and depending on the particular application at hand, many modifications, substitutions and variations can be made in and to the materials, apparatus, configurations and methods of use of the devices of the present disclosure without departing from the scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

We claim:

1. An enumeration method, comprising:
   for a first device including a two-wire interface having a transmit pin and a receive pin, initiating an enumeration of a second device by pulsing a first initiating pulse through the transmit pin;
   responsive to the first initiating pulse, receiving an at least one received pulse from the second device over the transmit pin, the at least one received pulse being modulated to represent an at least first bit of enumeration data, wherein the enumeration data is arranged according to an enumeration data sequence from the at least first bit to a final bit;
   transmitting additional initiating pulses to the second device through the transmit pin until a remainder of the enumeration data from the second device is received according to the enumeration data sequence as additional received pulses through the transmit pin; and
   subsequent to the receipt of all of the enumeration data, beginning a normal mode of operation configured responsive to the enumeration data in which the transmit pin is used to transmit data to the second device and in which the receive pin is used to receive data from the second device.

2. The enumeration method of claim 1, wherein the at least one received pulse and the additional received pulses are pulse-width modulated pulses.

3. The enumeration method of claim 1, wherein the at least one received pulse and the additional received pulses comprise amplitude-modulated pulses.

4. The enumeration method of claim 1, wherein the first initiating pulse and the additional initiating pulses comprise current pulses.

5. The enumeration method of claim 1, wherein the first initiating pulse and the additional initiating pulses comprise voltage pulses.

6. The enumeration method of claim 1, further comprising determining a virtual GPIO frame size for the second device from the enumeration data.

7. The enumeration method of claim 6, further comprising:
   at a general purpose input output (GPIO) interface in the first device, receiving a first set of signals from a processor and receiving a second set of GPIO signals from the processor;
   from the GPIO interface, transmitting the second set of GPIO signals through corresponding GPIO pins to the second device; and
   from the GPIO interface, providing in parallel the second set of GPIO signals to a finite state machine (FSM), wherein a size for the second set of GPIO signals equals the determined virtual GPIO frame size.

8. The enumeration method of claim 7, further comprising:
   serially transmitting the second set of GPIO signals as virtual GPIO signals over the transmit pin to the second device.

9. The enumeration method of claim 1, further comprising determining a number of wires for a virtual GPIO interface for the second device from the enumeration data.

10. The enumeration method of claim 1, further comprising comparing a count in the enumeration data to a stored value to determine whether the enumeration data is complete.

11. The enumeration method of claim 9, wherein the determined number of wires is two.

12. The enumeration method of claim 11, further comprising: transmitting pulse-width modulated virtual GPIO signals over the transmit pin to the second device during the normal mode of operation.

13. The enumeration method of claim 9, wherein the determined number of wires is three, the method further comprising:
receiving an external clock on a third wire for the virtual GPIO interface; and
synchronizing a serial transmission of virtual GPIO signals over the transmit pin to the second device responsive to the received external clock during the normal mode of operation.

14. An integrated circuit, comprising:
a transmit pin;
a receive pin;
a current source;
an enumeration circuit configured to initiate an enumeration of a remote device by transmission of a series of initiating pulses over the transmit pin to the remote device, the enumeration circuit being further configured to demodulate a series of pulses from the remote device received over the transmit pin to determine enumeration data for the remote device; and
a virtual GPIO interface configured to transmit virtual GPIO data to the remote device over the transmit pin in a normal mode of operation using a virtual GPIO frame size configured according to the enumeration data and configured to receive virtual GPIO data from the remote device over the receive pin.

15. The integrated circuit of claim 14, wherein the enumeration circuit comprises a finite state machine in the virtual GPIO interface.

16. The integrated circuit of claim 14, wherein the enumeration circuit is further configured to demodulate the series of pulses from the remote device according to a pulse-width demodulation.

17. The integrated circuit of claim 14, wherein the enumeration circuit is further configured to demodulate the series of pulses from the remote device according to an amplitude demodulation.

18. An enumeration method, comprising:
for a master device having a transmit pin and a receive pin, initiating an enumeration of a slave device following a power-up of the master device and prior to normal operation by transmitting an initial pulse through the transmit pin, wherein the slave device stores enumeration data that is arranged from a first bit to a last bit according to an enumeration data sequence;
responsive to the transmission of the initial pulse, receiving at least the first bit of the enumeration data from the slave device over the receive pin;
transmitting additional pulses through the transmit pin to the slave device to sequentially receive a remainder of the enumeration data according to the enumeration data sequence; and
subsequent to the receipt of all the enumeration data at the master device, beginning a normal mode of operation in which the master device communicates with the slave device according to a serial communication protocol configured responsive to the enumeration data.

19. The enumeration method of claim 18, wherein initiating the enumeration of the slave device is responsive to an assertion of a power-on reset signal.

20. The enumeration method of claim 18, wherein transmitting the initial pulse and the additional pulses comprises transmitting cycles of a bit-banged clock signal through the transmit pin.

21. The enumeration method of claim 18, wherein the serial communication protocol is a virtual GPIO communication protocol, the enumeration method further comprising using the enumerated data to determine a virtual GPIO frame size for the slave device.

22. The enumeration method of claim 18, wherein the serial communication protocol is a virtual GPIO communication protocol, the enumeration method further comprising using the enumerated data to determine a number of wires for a virtual GPIO interface for the slave device.

23. The enumeration method of claim 21, wherein beginning the normal mode of operation comprises:
at a general purpose input output (GPIO) interface in the master device, receiving a first set of signals from a processor and receiving a second set of GPIO signals from the processor;
from the GPIO interface, transmitting the second set of GPIO signals through corresponding GPIO pins to the slave device; and
from the GPIO interface, providing in parallel the second set of GPIO signals to a finite state machine (FSM), wherein a size for the second set of GPIO signals equals the determined virtual GPIO frame size.

24. The enumeration method of claim 23, further comprising serially transmitting the second set of GPIO signals as virtual GPIO signals over the transmit pin to the slave device.

25. A master integrated circuit, comprising:
a plurality of GPIO pins:
a GPIO interface configured to receive a first set of signals from a processor and to provide a GPIO portion of the first set of signals to the plurality of GPIO pins for transmission to a remote slave device as GPIO signals;
a dedicated transmit pin;
a dedicated receive pin; and
a finite state machine (FSM) configured to:
transmit a first pulse over the transmit pin to initiate a transmission of enumeration data from the slave device, wherein the enumeration data is arranged from a first bit to a last bit according to an enumeration data sequence;
receive at least the first bit of the enumeration data over the receive pin responsive to the transmission of the first pulse; and
transmit additional pulses through the transmit pin to the slave device to sequentially receive a remainder of the enumeration data according to the enumeration data sequence, wherein the FSM is further configured to serially transmit the transmit set of virtual GPIO signals to the slave device over the dedicated transmit pin according to a virtual GPIO frame size identified by the enumeration data.

26. The master integrated circuit of claim 25, wherein the FSM is further configured to serially the transmit the transmit set of virtual GPIO signals as pulse-width-modulated virtual GPIO signals.

27. The master integrated circuit of claim 25, wherein the FSM is further configured to serially the transmit the transmit set of virtual GPIO signals as amplitude-modulated virtual GPIO signals.

28. The master integrated circuit of claim 25, wherein the FSM is further configured to serially the transmit the transmit set of virtual GPIO signals as a series of voltage pulses.

29. The master integrated circuit of claim 25, wherein the FSM is further configured to serially the transmit the transmit set of virtual GPIO signals as a series of current pulses.

* * * * *